United States Patent

Takaoka et al.

[11] Patent Number: 5,719,540
[45] Date of Patent: Feb. 17, 1998

[54] METHOD OF DETERMINING THE PROPER AMOUNT OF EXPOSURE

[75] Inventors: Naoki Takaoka; Atsushi Takagi, both of Kanagawa, Japan

[73] Assignee: Fuji Photo Film Co., Ltd., Kanagawa, Japan

[21] Appl. No.: 433,203

[22] Filed: May 2, 1995

[30] Foreign Application Priority Data

May 2, 1994 [JP] Japan .................................. 6-093213

[51] Int. Cl.$^6$ .................................................. G03B 27/72
[52] U.S. Cl. ................................ 355/35; 355/32; 355/38; 355/67; 355/77
[58] Field of Search .................................. 355/1, 18, 32, 355/35, 38, 67–71, 77

[56] References Cited

U.S. PATENT DOCUMENTS

| | | | |
|---|---|---|---|
| 3,677,641 | 7/1972 | King et al. | 355/83 |
| 4,120,581 | 10/1978 | Takahashi et al. | 355/38 |
| 5,210,570 | 5/1993 | Minamisawa et al. | 355/38 |
| 5,278,921 | 1/1994 | Nakamura et al. | 382/18 |
| 5,475,493 | 12/1995 | Yamana | 356/404 |
| 5,502,776 | 3/1996 | Manabe | 382/172 |
| 5,561,494 | 10/1996 | Terashita | 355/38 |

FOREIGN PATENT DOCUMENTS

| | | |
|---|---|---|
| 52-156625 | 12/1977 | Japan . |
| 54-68632 | 6/1979 | Japan . |
| 55-29415 | 8/1980 | Japan . |
| 63-178222 | 7/1988 | Japan . |

*Primary Examiner*—R. L. Moses
*Assistant Examiner*—Shival Virmani
*Attorney, Agent, or Firm*—Sughrue, Mion, Zinn, Macpeak & Seas, PLLC

[57] ABSTRACT

The improved method of determining the proper amount of exposure comprises the steps of reading the entire portion of an original image, calculating the characteristic quantities of a principal image in the original image, determining a particular density range from the calculated characteristic quantities of the principal image, extracting only the pixels in said particular density range from the entire portion of the original image to determine the characteristic quantities of the original image, and determining the proper amount of exposure from said characteristic quantities of the original image. When applied to various types of optical image forming apparatus such as copiers, printers and pictographic devices, the method can determine the proper amount of exposure by a simple scanning procedure even if the original to be duplicated is a negative film or other medium having density failure and it hence ensures the formation of the proper and high-quality image in a consistent manner.

17 Claims, 6 Drawing Sheets

METHOD OF DETERMINING THE PROPER AMOUNT OF EXPOSURE

BACKGROUND OF THE INVENTION

This invention relates to a method for determining the proper amount of exposure that is applicable to optical image forming apparatus for use as copiers, printers, etc. and that enables the formation of high-quality images from originals even if their image does not have good balance in density or the quantity of light.

Most of the conventional image forming apparatuses such as color copiers and various types of color printers have been adapted for reproducing images from reflection-type originals such as printed matter. However, the technology of recording image information has recently become so versatile that image forming apparatuses have been commercialized that are capable of image recording on light-sensitive materials by reading images not only from reflection-type originals such as printed matter and photographs but also from transmission-type originals such as lantern slides, proofs, microfilms and color negatives.

Image forming apparatus that is adapted for the use of both a reflection-type and a transmission-type original is equipped with a light source unit or a scanning unit that compose the exposure optics for image formation from the transmission-type original, and the user performs imagewise exposure on the light-sensitive material by means of the appropriate exposure optics as selected in accordance with the kind of document to be duplicated and the size of the transmission-type original of interest.

With such optical image forming apparatus, the original image is read and image characteristic quantities for red (R), green (G), and blue (B) colors are extracted. In accordance with the extracted image characteristic quantities, the amount by which the light-sensitive material is to be exposed is controlled for the respective R, G and B colors so that a desired color image is formed. With a color photographic printer, a technique is widely known that calculates the average R, G and B densities of the image recorded on the original negative and that determines the respective amounts of exposure for R, G and B to be applied to a photographic paper in accordance with the calculated average densities.

In most cases, the quality of a finished image (print) depends on the quality of a principal image and a method is known that determines the amount of exposure of the light-sensitive material in such a way that the principal image can be finished to give satisfactory quality. See, for example, JPB 80/29412 which teaches an apparatus that divides the original image into a plurality of areas, that designates the area where a principal image lies, and that determines the amount of exposure for the light-sensitive material using the image characteristic quantities for the area where the principal image lies and those for the entire image.

JPA 77/156625 and 79/68632 teach an apparatus that extracts a principal image, such as an area giving skin tone in the finished image, from the original image and which then controls the amount of exposure of the light-sensitive material in such a way that the extracted area will come out appropriately in the finished image.

Additionally, JPA 88/178222 teaches an apparatus that determines the amount of exposure of a light-sensitive material in accordance with a combination of selected parameters such as the kind of the principal image, its size and the density level.

When negatives, photographs, etc. are used as the original, a human subject is included in about 80% of the original images and in almost all cases of the original images showing a human subject, he or she is recognized as the principal image. However, even if a human subject is dealt with as the sole principal image, the conventional method of determining the amount of exposure on the basis of the principal image taken either individually or in combination with the whole image has the following problem.

Consider, for example, the case of using a negative original. The skin of a light-complexioned woman is clearly different in tone from a man with suntan and the density differences on the negative are approximately 0.27 in cyan (C), 0.32 in magenta (M) and 0.44 in yellow (Y). If the reference skin density is set at an intermediate level with the conditions for exposing light-sensitive materials being so set that the skin density always coincides with reference, the density difference between the two persons is ±3 key for C (one key is about 20%), ±4 key for M and ±5 key for Y. If the criterion for accepting a proper image is ±1 key at best, the images of both persons will fail. The density differences between the two images will increase if cosmetic makeup, human race and other factors are taken into account.

Conventionally, various kinds of exposure amount for light-sensitive materials such as the amount of fundamental exposure, the amount of corrected exposure and the amount of modified exposure are determined from the characteristic quantities of the principal image. If these amounts of exposure are determined by the same calculation formula irrespective of associated parameters such as the kind of the principal image, its size and the density level, high enough precision is not attained to ensure consistent formation of the proper image. On the other hand, if the account of exposure are determined using formulae that take the associated parameters into amount, high precision can be attained. However, the operator, who has to identify the associated parameters and perform the necessary operations, needs sophisticated know-how. In addition the operations that must be performed are quite complicated.

SUMMARY OF THE INVENTION

The present invention has been accomplished under these circumstances and has as the principal object providing a method of determining the proper amount of exposure that is applicable to optical image forming apparatus such as copiers, printers and photographic printing devices, which is simple to operate and which yet is capable of forming the proper image of high quality in a consistent manner.

This object of the invention can be attained by a method of determining the proper amount of exposure, which comprises the steps of reading the entire portion of an original image, calculating the characteristic quantities of a principal image in the original image, determining a particular density range from the calculated characteristic quantities of the principal image, extracting only the pixels in said particular density range from the entire portion of the original image to determine the characteristic quantities of the original image, and determining the proper amount of exposure from said characteristic quantities of the original image.

Preferably, said characteristic quantities of the principal image in the original image are calculated from image densities of a principal image region in the original image.

Preferably, said principal image region is a preset fixed region in the middle of the original image, a preset fixed region centering on a position of the principal image designated in the original image, or a region that is obtained by extracting a preset decision region including a pixel at a position of the principal image in the original image, then determining a average density of the preset decision region, and identifying a pixel region that includes the position of the principal image and which has a density close to the determined average density.

Preferably, said position of the principal image is a position in the middle of the original image or a position designated in the original image outputted on a display.

Preferably, said preset decision region is a pixel region including nine pixels centering on the pixels at the position of the principal image.

Preferably, one of said characteristic quantities of the principal image is either one of an average density of the principal image region, a maximum density of the principal image region and a minimum density of the principal image region.

Preferably, after reading the entire portion of the original image, a density histogram of the entire portions of the original image is constructed.

Preferably, said particular density range is set as an effective density range on the basis of the density histogram and the characteristic quantities of the principal image.

Preferably, setting method of said effective density range is either one of a method for determining a preset density range by using the average density of the principal image region as a basis, a method for setting a density range in a principal image including area in the density histogram in consideration of its correlation with a normal distribution, and a method for setting a density range from the maximum density of the principal image region to the minimum density of the principal image region.

Said effective density range is a preferable density range of from ±0.2 to ±0.6, a more preferable density range of ±0.5 in the terms of logT on the basis of the average density of the principal image region, or a density range that is determined by taking into account a recordable exposure range for a record medium used for recording the original image.

Preferably, said characteristic quantities of the original image is obtained by reading the entire portion of the original image, then constructing a density histogram of the entire portions of the original image, setting an effective density range as the particular density range on the basis of the density histogram of the entire portions of the original image and the characteristic quantities of the principal image, extracting only pixels in the effective density range from the density histogram of the entire portions of the original image, constructing a density histogram of only the pixels in the effective density range, and being calculated from the density histogram of only the pixels in the effective density range.

If a negative original is used on an optical image forming apparatus, an improper image will sometimes form for several seasons such as the presence of density failure in the negative. Density failure can occur in one of two situations: i) when a picture is taken with backlighting, an electronic flash or under some other condition that creates a great difference in (film) exposure between a principal image and a portion of the background image; ii) the other situation is where there is not much difference in the amount of exposure between the principal image and the background image but where a wide area of the background image is occupied by a similar color as in the case of taking a picture of a person standing in front of a white wall.

The primary object of the invention is to determine the amount of exposure in such a way that the proper image can consistently be formed from negative originals that have a density failure due to the difference in the amount of exposure between a principal image and the background image.

The difference in the amount of exposure that occurs between a principal image and the background image when shooting to produce a negative original is expressed on the negative as the difference in density between the two images. As already mentioned the quality of a finished image is in most cases dependent upon the quality of the principal image and, hence, the proper amount of exposure for image formation may be defined as the quantity of exposure with which the principal image can be expressed appropriately on a light-sensitive material. Therefore, if image formation is done with the proper amount of exposure, the background image cannot be finished to give satisfactory quality on account of the big difference in density from the principal image. As long as the main objective is to form the proper image (namely, the principal image) with an optical image forming apparatus, there is no need to take into account a measure for ensuring that the background image having a substantial difference in density from the principal image in the original image is finished to permit proper expression. However, with the conventional method of determining the proper amount of exposure, one cannot form the proper image consistently since not only the principal image in the original image but also the background image having a substantial difference in density from the principal image is used in calculations for determining the proper amount of exposure.

On the other hand, about 60% of negative originals can be calculated for the proper amount of exposure in terms of large-area transmission density (LATD). In 90% of the negative originals, the face of a human subject occupies no more than 6% of the entire image. This means that with commonly used originals, the proper amount of exposure for image formation is calculable even if the proportion of the mathematics operations for determining it as occupied by the characteristic quantities of the principal image is small.

For the reasons stated above, the present invention adopts the following novel concept in determining the proper amount of exposure: when calculating the amount of exposure which a particular light-sensitive material should be given for image formation, a portion of the background image in an original image that has a substantial difference from the principal image in terms of the amount of exposure is counted out, and the characteristic quantities of the original image are extracted from the principal image and another portion of the background image that has a comparable amount of exposure to the principal image, and the proper amount of exposure is then determined to insure that the proper image can consistently be formed even if the original is a negative one that has a density failure due to the difference in the amount of exposure.

In addition the method depends less on the characteristic quantities of the principal image for calculating the proper amount of exposure in the printing operation and, hence, it is less subject to the influences of the differences in skin density and other parameters due to various factors such as human race and sex.

The conventional method of determining the proper amount of exposure is based on the idea of positively using the characteristic quantities of the principal image to calculate the amount of exposure that should be given to a particular light-sensitive material; this is essentially different from the concept of present invention which is based on extracting the portion of the unwanted background image so as to eliminate its influence.

DETAILED DESCRIPTION OF THE INVENTION

The method of the invention for determining the proper amount of exposure will now be described in detail with reference to the accompanying drawings.

Figure 1:
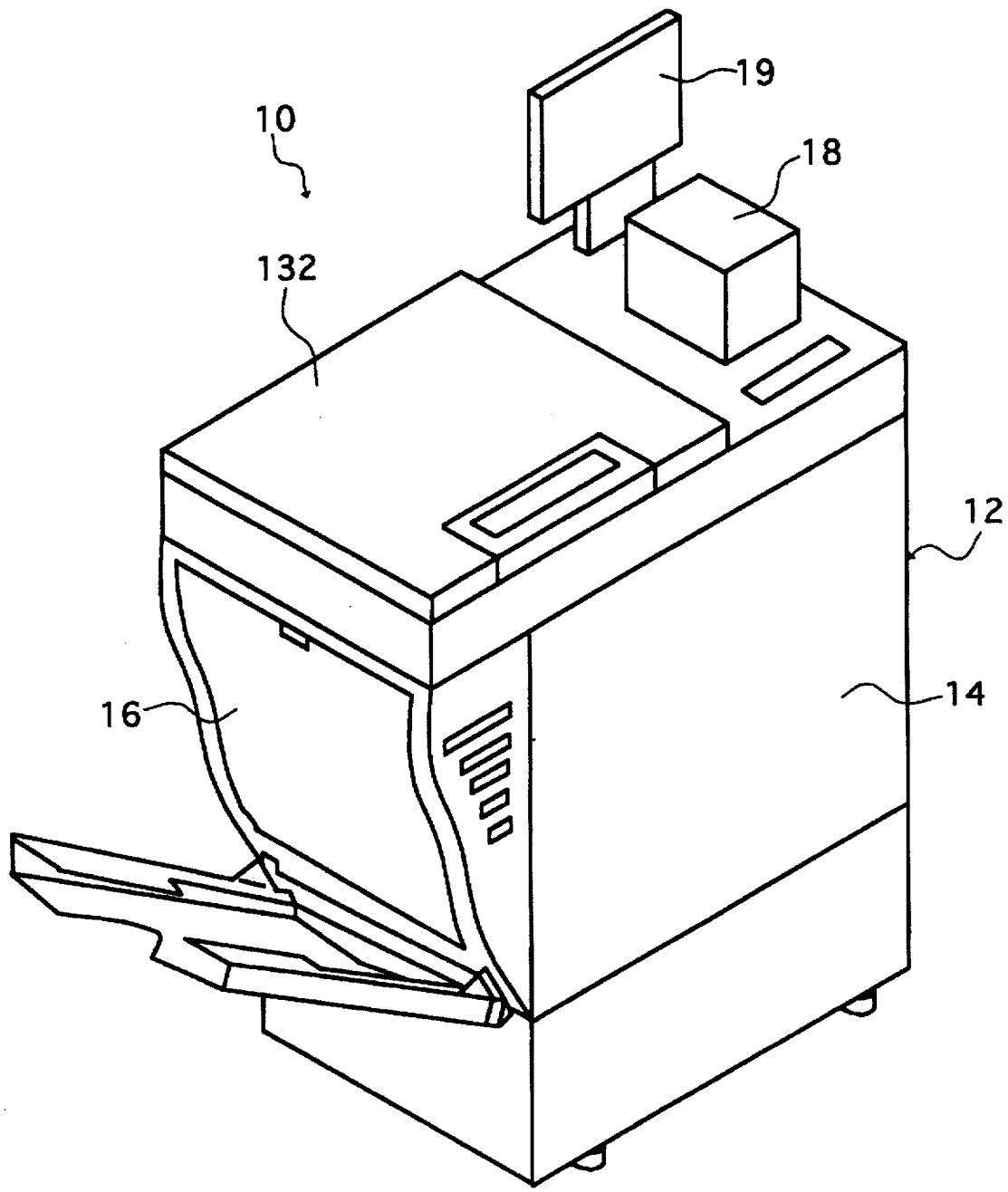
FIG. 1 is a simplified perspective view of a copier that uses the method of the invention for determining the proper amount of exposure.
Figure 2:
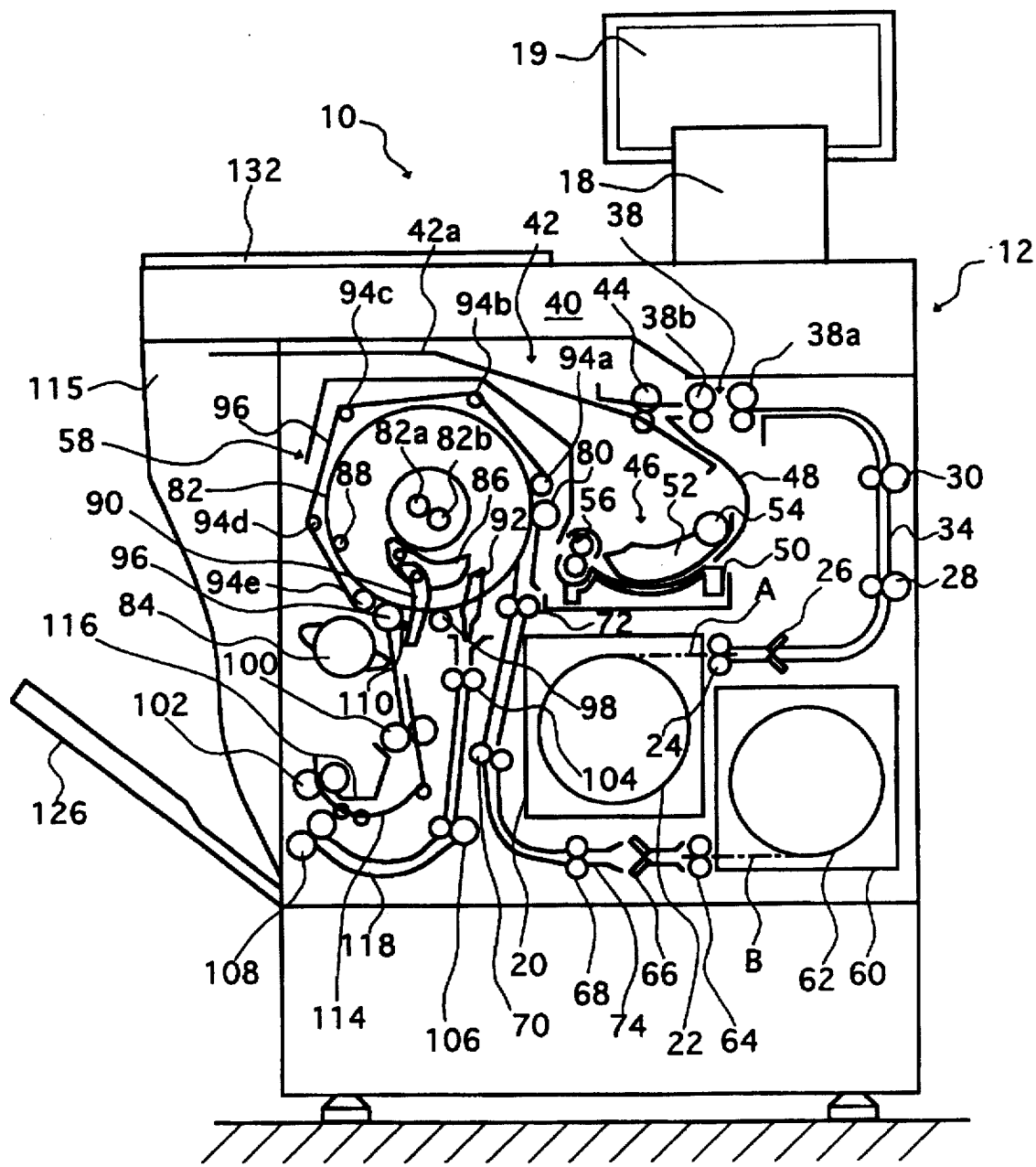
FIG. 2 is a simplified view showing the interior of the copier shown in FIG. 1.

FIG. 1 is a perspective exterior view of a copier that uses the method of the invention for determining the proper amount of exposure, and FIG. 2 is a simplified view of the interior of the copier.

The copier shown in FIG. 1 is an apparatus that uses as a recording medium a light-sensitive material that requires thermal development and which transfers and forms an image onto an image-receiving layer in an image-receiving material in the presence of an image-forming solvent such as water. This apparatus is capable of duplicating not only the image on reflection-type originals such as printed matter and photographs but also the image on transmission-type originals such as 135 size lantern slides, proofs and color negatives.

It should be noted that the method of the invention for determining the proper amount of exposure is in no way limited to the particular light-sensitive materials and image forming method that are mentioned above and that it is applicable to various other types of light-sensitive material and image-forming methods that are capable of forming a latent image by imagewise exposure and processing it by a predetermined procedure to produce a visible image.

Hence, light-sensitive materials that may be used are exemplified by conventional types of color photographic materials (e.g. negative films, reversal films and color photographic papers), color diffusion transfer light-sensitive materials, thermally processable color photographic materials and light- and pressure-sensitive color photographic materials. The amount of exposure to be given to these materials may be determined by the method of the invention and, after exposure suitable for a particular light-sensitive material, the latent image may be processed to become visible.

If a positive image is to be formed from a positive original, so-called "positive-positive" light-sensitive materials may specifically be used; if a positive image is to be formed from a negative original, so-called "negative-positive" light-sensitive materials should be used.

The copier generally shown by 10 in FIG. 1 in box-shaped and comprises a housing 12 that has a front door 14 and a side door 16. To have the interior of the apparatus exposed, these doors may be opened.

The copier 10 is fitted on the top of the housing with a detachable film scanning unit 18 for copying small-size transmission-type originals such as 135 size color negatives and lantern slides. For copying comparatively large transmission-type originals such as 4×5 size lantern slides, proofs and sleeves, a dedicated light source unit is placed on top of the copier in a predetermined position.

Positioned on top of the copier 10 and behind the film scanning unit 18 is a monitor 19 that displays an original image as read by a line sensor 160 (to be descried later) and which performs various manipulations.

The copier 10 has a light-sensitive material magazine 20 positioned in the lower part of the center of the housing 12. The magazine 20 contains a roll 22 of a thermally processable light-sensitive material A.

A roller pair 24 for withdrawing and transporting the thermally processable light-sensitive material A from the magazine 20 is positioned near its exit. A cutter 26 is positioned downstream of the roller pair 24 in the direction of the transport of the thermally processable light-sensitive material A (the term "downstream" as used hereinafter shall always be referred against the transport of the light-sensitive material). The cutter 26 will cut the thermally processable light-sensitive material A to a predetermined length after it has been withdrawn out of the magazine 20.

Transport rollers 28 and 30 and transport guide plates 34 are positioned downstream of the cutter 26 so as to transport the thermally processable light-sensitive material A upward to an exposing section 38. The exposing section 38 is provided between transport roller pairs 38a and 38b and equipped with an exposure unit 40 on its top. In the illustrated copier 10, the thermally processable light-sensitive material A is transported through the exposing section 38 as it is held in a predetermined position by means of transport roller pairs 38a and 38b and the transported light-sensitive material A is subject to slit scan exposure by means of slit light that carries image information from the exposure unit 40 (or film scanning unit 18).

Details of the exposure unit 40 and the film scanning unit 18 will be given later with reference to FIG. 3.

A switchback section having a transport guide plate 42a and a transport roller pair 44 is provided alongside the exposing section 38. A water applicator section 46 is provided below the exposing section 38.

The thermally processable light-sensitive material A that has been withdrawn out of the magazine 20 to be cut to a predetermined length and that has been transported to the exposing section 38 where it is imagewise exposed is brought into the switchback section 42 by means of the roller pair 44 and the guide plate 42a. Then, the roller pair 44 rotates in reverse direction so that the light-sensitive material A is ejected from the switchback section 42 and guided by a transport guide plate 48 to be transported to the water applicator section 46.

The water applicator section 46 has an application tank 50 filled with an image forming solvent and a guide member 52 that is positioned in a face-to-face relationship with the tank 50. A supply roller 54 for bringing the thermally processable light-sensitive material A into the tank 50 is positioned at an end of the water applicator section 46 which is upstream of the tank 50, and a squeeze roller pair 56 for removing excess water from the light-sensitive material A is positioned at the other end of the water applicator section 46 which is downstream of the tank 50.

The thermally processable light-sensitive material A that has been exposed in the exposing section 38 is driven by the supply roller 54 to pass between the application tank 50 and the guide member 52 as it is coated with water which is an image forming solvent. Thereafter, the light-sensitive material A is passed through the squeeze roller pair 56 so that it is freed of excess water before it is sent to a thermal development and transfer section 58 which is positioned downstream of the water applicator section 46.

An image-receiving material magazine 60 is positioned to the right of the magazine 20 as seen in FIG. 2. The magazine 60 contains a roll 62 of an image-receiving material B. The image-receiving material B is formed in a smaller width than the thermally processable light-sensitive material A in order to insure that the two members can be easily separated after the thermal development which will be descried hereinafter.

A withdrawing roller pair 64 for withdrawing and transporting the image-receiving material B is positioned near the exit of the magazine 60. A cutter 66 is positioned downstream of the roller pair 64 so that it cuts the image-receiving material B to a predetermined length after it has been withdrawn out of the magazine 60. It should be mentioned here that the image-receiving material B is cut to a shorter length than the light-sensitive material A in order to insure that the two members can be easily separated after the thermal development which will be descried hereinafter.

Positioned downstream of the cutter 66 are transport roller pairs 68, 70 and 72, and transport guide plates 74; the image-receiving material B that has been cut to a predetermined length is transported from below the magazine 20 to go upward so that it is brought into the thermal development and transfer section 58. The transport roller 72 also serves as a registration roller for correcting any "skew" of the image-receiving material B that may have occurred as a result of transport. The "skew" corrected image-receiving material B is thus brought into the thermal development and transfer section 58.

A laminating roller 80 for bringing the thermally processable light-sensitive material A and image-receiving material B into a unitary assembly is positioned downstream of the squeeze roller pair 56 and the transport roller pair 72. The laminating roller 80 is in pressure-contact with a heating drum 82 in the thermal development and transfer section 58. It is coupled to a drum motor 84 by a known driving force transmission system (not shown) so that the driving force of the motor 84 is transmitted to the roller 80 for rotating it.

The thermally processable light-sensitive material A is brought into the gap between the laminating roller 80 and the heating drum 82 by means of the squeeze roller pair 56. Except that the light-sensitive material A precedes the image-receiving material B by a predetermined length, the transport of the two members is synchronous and the image-receiving material B is likewise brought into the gap between the laminating roller 80 and the heating drum 82 so that it is placed in a superposed relationship with the light-sensitive material A.

As already mentioned, the four sides of the light-sensitive material A are slightly longer than those of the image-receiving material B and, hence, when superposed, the four sides of the former will project beyond the latter.

A cam 86 and a feeler 88 are fixed to a lateral side of the heating drum 82 in the thermal development and transfer section 58. Cam 86 is adapted to be engageable with stripping fingers 90 and 92 (to be described later) on the heating drum 82 and as it rotates, the cam 86 engages the fingers 90 and 92 successively to pivot them. Feeler 88 is used to check whether the heating drum 82 is in registry with each of the light-sensitive material A and the image-receiving material B.

A pair of halogen lamps 82a and 82b are contained in the heating drum 82. The two halogen lamps 82a and 82b produce different powers, say, 400 W and 450 W, for heating the surface of the drum 82 to a predetermined temperature. In the illustrated copier 10, both lamps are used to heat the drum 82 to the predetermined temperature but lamp 82a alone is used during steady-state operation after the predetermined temperature has been reached.

An endless belt 96 is wound around the heating drum 82 as it is stretched on five rollers 94a, 94b, 94c, 94d and 94e. The four rollers 94a–94d are made of stainless steel whereas the roller 94e is made of rubber. The outside surface of the endless belt 96 between the rollers 94a and 94e is in pressure-contact with the circumference of the heating drum 82.

The rubber roller 84 is coupled to the drum motor 84 by means of a known driving force transmission system (not shown); as the roller 94e rotates, the endless belt 96 is rotated and the rotational force is transmitted to the heating drum 82 by the force of friction between the endless belt 96 and the heating drum 82, which in turn rotates.

The known driving force transmission system (not shown) allows the drum motor 84 to drive a plurality of driven parts in unison, including roller 94e, laminating roller 80, squeeze roller pair 56, as well as the following components to be described later: a bending guide roller 96, a stripping roller 98, light-sensitive material ejecting roller pairs 100 and 102, and image-receiving material ejecting roller pair 104, 106, and 108.

The thermally processable light-sensitive material A and the image-receiving material B that have been combined by the laminating roller 80 are transported as they are held in the superposed relationship between the heating drum 82 and the endless belt 96 so that they travel over a distance equal to about two-thirds of the circumference of the heating drum 82 (between rollers 94a and 94e). If necessary, the transport of the two members A and B may be ceased as they are completely confined between the heating drum 82 and the endless belt 96 so that they are heated for a predetermined time. In the illustrated case of image formation, the thermally processable light-sensitive material A is heated to release mobile dyes while, at the same time, the released dyes are transferred onto the dye-fixing layer in the image-receiving material B so that a visible image is formed on the image-receiving layer in the image-receiving material B.

Bending guide roller 96 which is pressed against the circumference of the heating drum 82 under a predetermined force is positioned downstream of the roller 94e in the direction of the rotation of the drum 82. Stripping finger 90 and a pinch roller 110 are positioned downstream of the guide roller 96. Stripping finger 90 is pivotally supported on a shaft and it is allowed to pivot under the action of the cam 86 so that it can contact or depart from the surface of the heating drum 82. The pinch roller 110 is normally held against the bending guide roller 96 at a predetermined pressure and adapted in operative association with the pivoting of the stripping finger 90 in such a way that when the latter contacts the heating drum 82, the roller 110 will get clear of the guide roller 96.

When both the light-sensitive material A and the image-receiving material B have been transported the position of stripping finger 90, the cam 86 works to have the finger contact the heating drum 82 and the front end of the light-sensitive material A which has been superposed on the image-receiving material B after a predetermined length of lead engages the finger 90, which then strips the light-sensitive material A from the surface of the heating drum 82.

When the front end of the light-sensitive material A is stripped from the heating drum 82 by the predetermined length, the cam 86 works to get the finger 90 clear of the heating drum 82 while, at the same time, the pinch roller 110 contacts the guide roller 96 so that the stripped front end of the light-sensitive material A is held between the two rollers 110 and 96. Hence, the light-sensitive material A which has been stripped from the heating drum 82 is transported downward as it is held between the pinch roller 110 and the bending guide roller 96.

Light-sensitive material ejecting roller pairs 100 and 102 and two transport guide plates 114 and 116 are positioned downstream of the pinch roller 110 and guide roller 96; these roller pairs and guide plates are so adapted that the light-sensitive material A which has been stripped from the heating drum 82 is transported first downward, then to the left as seen in FIG. 2 so that it is ejected into a scrap light-sensitive material stack box 115.

Stripping roller 98 and stripping finger 92 are positioned downstream of the guide roller 96 and stripping finger 90 in the direction of the rotation of the heating drum 82. Stripping roller 98 is made of silicone rubber and is urged against the circumference of the heating drum 82 at a predetermined pressure so that it will rotate under the action of the drum motor 84 as already mentioned a few paragraphs ago. On the other hand, the stripping finger 92 is so adapted that it will pivot under the action of the cam 86 to either contact or depart from the circumference of the heating drum 82.

If the light-sensitive material A is stripped from the heating drum 82 and when only the image-receiving material B is transported around the drum 82, the cam 86 works to have the stripping finger 92 contact the drum 82, thereby stripping the front end of the image-receiving material B. At the same time, the stripping roller 98 and the stripping finger 92 contact the heating drum 82 and guide the image-receiving material B to bend downward for further transport.

Image-receiving material ejecting roller pairs 104, 106 and 108, as well as transport guide plates 118 are positioned downstream of the strip roller 98 and the image-receiving material B which has been stripped from the heating drum 82 is transported first downward, then to the left as seen in FIG. 2 so that it is ejected onto a tray 126 fixed on the left side of the housing 12.

If necessary, a drum fan, a ceramic heater or any other suitable means may be positioned along the transport paths of the light-sensitive material A and the image-receiving material B which have been stripped from the heating drum 82 or in the neighborhood of the heating drum 82 for the purpose of accelerating the drying of the two members A and B.

As already mentioned, the exposure unit 40 is positioned above the exposing section 38, and the copier 10 is fitted in the upper right portion of the housing 12 (as seen in FIG. 2) with the detachable film scanning unit 18 which is specifically used to copy small-size transmission-type originals T such as 135 side color negatives and lantern slides.

Figure 3:
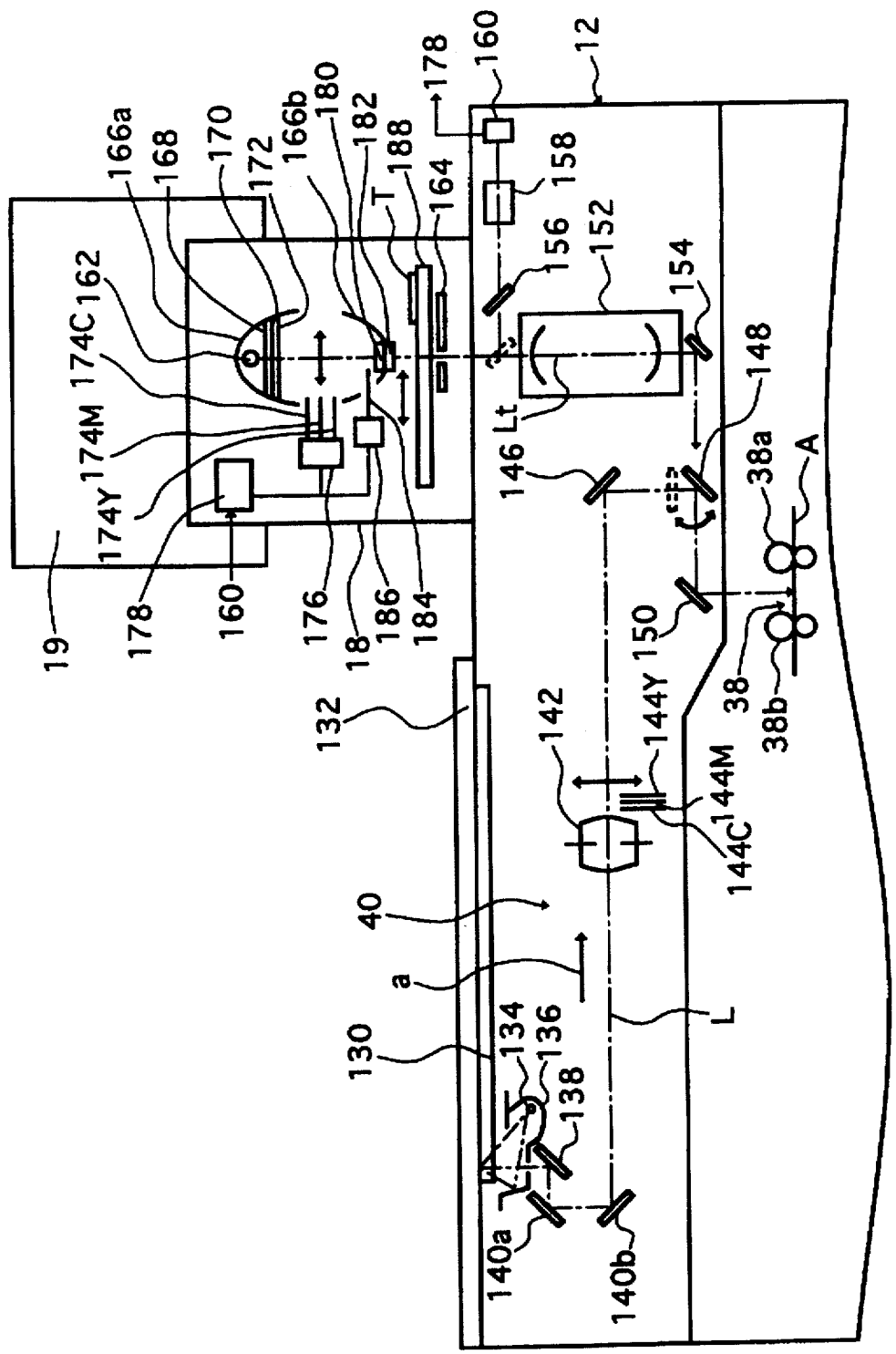
FIG. 3 is a simplified view showing the interior of the exposure unit in the copier of FIG. 1, as well as the interior of a film scanning unit that may optionally be loaded in the copier.

FIG. 3 is a diagram showing the concept of the exposure unit 40 and the film scanning unit 18. The exposure unit 40 provides exposure optics that is used primarily for copying the images of reflection-type originals such as printed matter and photographs, and those of comparatively large-size transmission-type originals such as proofs and lantern slides.

As FIG. 3 shows, a document platen 130 and a document pressing plate 132 are positioned on top of the housing 12 of the copier 10; the document platen 130 is used to carry a reflection-type original and typically made of transparent glass, and the document pressing plate 132 is fitted as required to fix the reflection-type original on the platen 130 and may be removed if there is no need to use it.

When copying the image of a comparatively large-size transmission-type original such as a proof or a sleeve, the plate 62 is removed and a dedicated light source unit for illuminating the document on the platen 130 from above is mounted in a predetermined position.

Located below the document platen 130 is a light source unit which is an integral assembly of an exposing light source 134 to be used for copying the image of the reflection-type original, a reflector 136 and a mirror 138. In the illustrated apparatus, the reflector 136 also serves as a slit defining member that restricts the width, taken in the scanning direction, of reflected light from the reflection-type original (or transmitted light through a transmission-type original).

The light source unit under consideration moves beneath the platen 130 in the scanning direction indicated by arrow a so that the transmission-type original is illuminated with light from the light source 134. It should be mentioned here that when copying a large-size transmission-type original using a dedicated light source unit, the light source 134 is not lit but the light source unit is simply moved to scan the underside of the platen 130, whereupon the transmitted light from the transmission-type original passes through the slit.

The light issuing from the light source 134 is reflected by the reflection-type original, passes through the slit and is reflected by the mirror 138 to travel in a predetermined direction. The reflected light is then admitted into a mirror unit which is an integral assembly of two mirrors 140a and 140b and by which the light travelling in the optical path L is reflected in predetermined directions. The mirror unit is adapted to move in the same direction as the above-mentioned light source unit but at one half its speed.

Located downstream of the mirror unit in the optical path L is a lens unit 142 which is an integral assembly of an imaging lens and a variable diaphragm for adjusting the quantity of light (i.e., density). The variable diaphragm consists typically of two light-shielding plates that are opposed to each other in a direction perpendicular to the optical path L and which can be inserted into or removed from the optical path as required. The quantity of reflected light is controlled by adjusting the gap between the two light-shielding plates.

A color filter unit for adjusting color balance is positioned downstream of the lens unit 142. The color filter unit is composed of three color filter plates, namely, a Y (yellow) filter 144 Y, a M (Magenta) filter 144 M and a C (cyan) filter. The color balance of reflected light is controlled by adjusting the amount in which each of the three color filter plates is inserted into the optical path L.

Located downstream of the color filter unit in the optical path L are three mirrors 146, 148 and 150 for causing the reflected light to be reflected in predetermined directions. The oncoming reflected light in the optical path L is further reflected in predetermined directions by mirrors and keeps travelling in the optical path L until it reaches the exposing unit 44, where it is focuses for exposure of the thermally processable light-sensitive material A in the process of scanning transport.

The mirror 148 is adapted to be pivotal; for copying reflection-type originals and large-size transmission-type originals using the exposure unit 40, the mirror 148 takes the position indicated by a solid line in FIG. 3 and for copying a small-size transmission-type T such as a color negative using film scanning unit 18, the mirror 148 moves to the position indicated by a dashed line in FIG. 3.

The exposure unit 40 is also fitted with an image sensor (not shown) that measures the quantity of reflected light for the respective colors, red (R), green (G) and blue (B). The image sensor reads the original image in a prescanning step and determines the amount by which the quantity of light is to be adjusted through the variable diaphragm in the lens unit 142, as well as the amounts by which the respective color filter plates in the color filter unit are to be inserted into the optical path L.

As already mentioned, the illustrated copier 10 is an apparatus that is also capable of copying small-size transmission-type originals such as a color negative T and a lantern slide; it has the film scanning unit 18 mounted detachably on top of the right portion of the housing 12 to provide exposure optics for copying the image of transmission-type original T. The exposure unit 40 lying below the film scanning unit 18 has the following components positioned to the right of mirrors 146 and 148 as seen in FIG. 3: a zoom lens 152 and a mirror 154 that compose exposure optics for copying transmission-type original T, as well as a moving mirror 156, imaging lens 158 and a line sensor 160 for measuring the quantity, color, etc. of transmitted light through the transmission-type original T in the prescan step.

The film scanning unit 18 illuminates the transmission-type original T with light from the light source 162 as it moves in synchronism with the transport of the thermally processable light-sensitive material A. The light transmitted through the original T and the slit 164 in that order is projected onto the light-sensitive material A as enlarged with zoom lens 152 at a magnification of 200–850%, whereby the light-sensitive material A is exposed to the transmitted light through the original T for copying the image of that original.

The light source 162 may be of any type that is suitable for color reprography, as exemplified by a halogen lamp and a flash lamp. Located above the light source 162 is a reflector 166a by which the light from the light source 162 is reflected toward the original T, and located below the light source 162 is a reflector 166b that is opposed to the reflector 166a so an even higher optical efficiency is achieved.

Located downstream of the light source 162 along the optical path Lt are an IR cut filter 168, a UV cut filter 170 and a B-G notch filter 172 for cutting off a mixture of blue and green lights.

Located downstream of the B-G notch filter 172 is a filter section that adjusts the color balance of the light illuminating the transmission-type original T and, hence, the color balance of the image to be formed. The filter section is composed of three color filter plates, Y filter 174 Y, M filter 174 M and C filter 174 C, and an adjusting unit 176 which allows the respective filters to be inserted into the optical path Lt.

The illustrated adjusting unit adjusts the amounts of insertion of the respective filters into the optical path Lt, thereby adjusting the color balance of the light illuminating the transmission-type original T. In order to set the conditions for image formation or in order for the user to perform color adjustments and in accordance with such information as the exposure correcting conditions that depend on the quality of the image on the original T, the adjustment unit 176 moves the respective filters by a known moving means such as a rack and pinion using associated pulse motors as drive sources, whereby the respective filters are inserted into the optical path Lt.

The amounts in which the respective filters are inserted into the optical path by means of the adjustment unit 176 are determined by a control unit 178. In the illustrated copier 10, the amounts in which the respective color filter plates are to be inserted by the adjusting unit 176 are determined in accordance with the method of the invention for determining the proper amount of exposure.

A variable diaphragm 184 for adjusting the quantity of light that illuminates the transmission-type original T is located downstream of the filter section. The variable diaphragm 184 is composed of light-shielding plates, a ND filter having a density gradient or the like. In the illustrated apparatus, an adjusting unit 186 controls the quantity of light by adjusting the amount in which the variable diaphragm 184 is to be inserted into the optical path Lt.

In order to set the conditions for image formation or in order for the user to perform color adjustments and in accordance with such information as the exposure correcting conditions that depend on the quality of the image on the original T, the adjustment unit 186 moves the diaphragm 184 by a known moving means such as a rack and pinion using an associated pulse motor as a drive source, whereby the variable diaphragm 184 is inserted into the optical path Lt.

The amount in which the variable diaphragm 184 is inserted into the optical path by means of the adjustment unit 186 is also determined by the control unit 178. In the illustrated copier 10, the amount in which the variable diaphragm 184 is to be inserted by the adjusting unit 186 is determined in accordance with the method of the invention for determining the proper amount of exposure.

A diffusion glass 180 and a Fresnel lens 182 are positioned at the opening in the reflector 166b located downstream of the variable diaphragm 184. The diffusion glass 180 diffuses and mixes the rays of light that have been color adjusted in the filter section so as to create uniform light that is free from the problem of unevenness in colors and illumination. The Fresnel lens 182 has such a function that the light diffused by the diffusion glass 180 is allowed to travel along the optical path Lt so it becomes convergent.

The transmission-type original T is placed on a scan table 188 located downstream of the Fresnel lens 182. The scan table 188 holds the transmission-type original T in a predetermined position and the original T is scanned by transversely moving it (as seen in FIG. 3) in synchronism with the transport of the thermally processable light-sensitive material A in the exposing section 38. Located beneath the scan table 188 is a slit defining member 164 that extends longitudinally in a direction perpendicular to the direction of movement (scanning) of the original T and which has the center of width in alignment with the optical axis Lt.

Thus, the transmission-type original T moving above the slit 164 in a direction perpendicular to it will be slit scanned by the light from the light source 162.

The method of moving the transmission-type original T over the scan table 188 is in no way limited and any known transport means such as thread transmission, wrapping transmission or a rack and pinion adjustment may be effectively used. The moving speed of the original T is one nth of the transport speed of the thermally processable light-sensitive material A, with n being the copy ratio that is achievable by the film scanning unit 18.

In the illustrated apparatus, the transmission-type original T may be scanned either by moving it over the scan table 188 or by moving the scan table 188 per se.

The transmitted light that has passed through the slit 164 travels in the optical path Lt to be admitted into the zoom lens 152 located within the exposure unit 40. The transmitted light from the original T which has passed through the slit 164 undergoes magnification to 200%–850% by means of the zoom lens 152 to form an image at the exposing position in the exposing section 44.

The transmitted light from the original T which has passed through the zoom lens 152 has its optical path deflected by the mirror 154 through an angle of about 90° so that it is brought into agreement with the optical path L of the reflected light from the reflection-type original before it falls on the mirror 150. As already mentioned, the mirror 148 pivots to the position indicated by a dashed line in FIG. 3 when the image of the transmission-type original T is to be copied using the film scanning unit 18.

As in the case of the reflected light from the reflection-type original, the transmitted light from the original T that has been reflected downward by the mirror 150 is focused at a predetermined exposing position on the thermally processably light-sensitive material A in the process of transport by the roller pairs 38a and 38b, so as to perform slit scan exposure on the material A.

It should be noted that the transmission-type original T is moved by the scan table 188 in synchronism with the scan transport speed of the light-sensitive material A, namely, at a speed which is one nth of the transport speed of the material A, with n being the factor of magnification by the projection optics. Hence, the whole image of the original T is scanned for exposure on the light-sensitive material A as it is moved over the entire image region.

As already mentioned the illustrated apparatus have the moving mirror 156, imaging lens 158, line sensor 160 and other devices for measuring the quantity, color, etc. of the transmitted light from the original T in the prescan step; using these devices, the apparatus performs prescanning prior to the copying of the original T so that its image is read for determining the amount by which the image to be copied should be exposed, namely, the amounts by which the three color filter plates (Y filter 174 Y, M filter 174 M, and C filter 174 C) in the filter section should be inserted into the optical path Lt, and the amount by which the variable diaphragm 184 should be inserted into the optical path Lt.

As FIG. 3 shows, moving mirror 156 is positioned upstream of the zoom lens 152 in such a way it can be inserted into or removed from the optical path Lt as required. During prescan, the moving mirror 156 is inserted into the optical path Lt as indicated by a dashed line in FIG. 3, whereby the transmitted light from the original T is deflected through an angle of 90°.

The transmitted light thus deflected in the optical path by the mirror 156 is adjusted for focus by means of the imaging lens 158 before it is admitted for imaging in the line sensor 160.

The line sensor 160 consists of three rows of line sensors, one having a R filter, the second having a G filter, and the third having a B filter. Each line sensor is typically a 256-pixels-MOS line sensor which is capable of reading the image of transmission-type original T at a resolution of 256 pixels per line for each of the three primary colors R, G and B.

The output from the line sensor 160 is forwarded to the control unit 178, which determined the amount by which the thermally processable light-sensitive material A should be exposed during copying of the image of the original T, namely, the amounts by which the respective color filter plates in the filter section should be inserted into the optical path Lt, and the amount by which the variable diaphragm 184 should be inserted into the optical path Lt.

The illustrated copier 10 is adapted to determine the proper amount of exposure in accordance with the present invention by the following procedure: the principal image characteristic quantities (i.e., the image characteristic quantities of a principal image) are calculated from the image of the transmission-type original T which has been read by prescanning; a particular density range is determined from the calculated principal image characteristic quantities; only the pixels in the particular density range are extracted from the whole image to determine the characteristic quantities of the original image, and the amount by which the thermally processable light-sensitive material A should be exposed (this amount of exposure of the light-sensitive material is hereunder referred to as the "amount of exposure for copying") is determined from said original image characteristic quantities.

The procedure will now be described in detail.

First, the line sensor delivers output (color) signals to the control unit 178, which performs A/D conversion and logarithmic transformation on said output signals to produce image density signals for respective colors, which are then stored separately in a memory (RAM). At the same time, the control unit 178 performs the necessary image processing on the image density signals (e.g., negative-to-positive conversion is performed if the transmission-type original T is a color negative) and, thereafter, it outputs the image of original T to be displayed on the monitor 19.

The operator watches the output image on the monitor 19 and enters the position of the principal image using an input device such as a mouse or a cursor. The control unit 178 determines the average density of a particular "decision region" including a designated position, for example, nine pixels centering on a designated pixel; it then identifies a pixel region that includes the designated position and which has a density close to the determined average density, and concludes that the thus identified pixel region is the principal image region.

This is not the only method that can be used for determining the principal image region and it may be identified from the center of the original image which is preliminarily designated as a reference position. Alternatively, the principal image region may be a fixed region in the middle of the image. If desired, one need not identify a particular region but a fixed region centering on a position designated by the operator may be the principal image region.

In the next step, the principal image characteristic quantities, namely, the image characteristic of the principal image such as average density, maximum density and minimum density, are calculated from the principal image region.

The control unit 178 sets an effective density range from the calculated principal image characteristic quantities, extracts only the pixels in the effective density range from the pixel densities stored in the memory, calculates the original image characteristic quantities for the entire part of the image on the transmission-type original T (such original image characteristic will hereunder sometimes be referred to simply as the "image characteristic quantities") on the basis of the extracted pixels, determines the amount of exposure for copying from the calculated image characteristic quantities, determines the amounts by which the respective color filter plates in the filter section should be inserted into the optical path Lt, as well as the amount by which the variable diaphragm 184 should be inserted into the optical path Lt, and supplies relevant instructions to adjusting means 176 and 186.

Stated more specifically, the control unit 178 calculates the principal image characteristic quantities in the manner described above; in addition, it reads the pixel densities from the memory and constructs a density histogram. Three density histograms may be constructed for the three primary colors R, G and B; alternatively, a single density histogram may be constructed from the pixel densities of the three colors R, G and B.

The control unit 178 then sets an effective density range on the basis of the constructed density histogram and the previously calculated principal image characteristic quantities. Several methods can be used to set an effective density range: in one method, the average density of the principal image region is used as a basis for determining a particular density range (e.g. about ±0.2–±0.6, preferably about ±0.5, in the terms of logT); in another method, an effective density range is set in a principal image including area in the density histogram in consideration of its correlation with a normal distribution; in a third method, the range from the maximum density of the principal image region to its minimum density is set as an effective density range. Needless to say, the effective density range must be determined taking into account the recordable range for the thermally processable light-sensitive material A (on which the original image is to be copied).

Subsequently, the pixels in the effective density range are extracted from the already constructed histogram to construct a density histogram (excluding the pixels not within the effective density range) and the image characteristic quantities are calculated from the second density histogram, which are used as a basis for calculating and determining the amount of exposure for copying.

The process is described below in greater detail with reference to FIG. 4, which is a positive image produced by conversion from the image on the SG400 negative film (product of Fuji Photo Film Co., Ltd.). The principal image in the scene on the film is (the face of) a human subject. The background image contains his or her clothes, window sashes, a building, an electric line supporting pole, the sky, etc. In the scene on this negative film, the group of the human subject, clothes and window sashes differs in density (or the amount of exposure) from the group of the building, the pole and the sky, indicating that the film was shot with backlighting.

According to the conventional method of determining the amount of exposure for copying, the operator guesses that the scene was taken with backlighting in view of the image characteristic quantities and sets the amount of exposure appropriate for backlighting; alternatively, the operator determine the amount of exposure in such a way that the skin density of the principal image equals the reference skin density. In contrast, the method of the invention determines the amount of exposures for copying in consideration of the difference in film exposure, or the difference between densities on the negative film.

Figure 4:
FIG. 4 is a negative-to-positive transformed image which is intended to illustrate the method of the invention for determining the proper amount of exposure.
Figure 5:
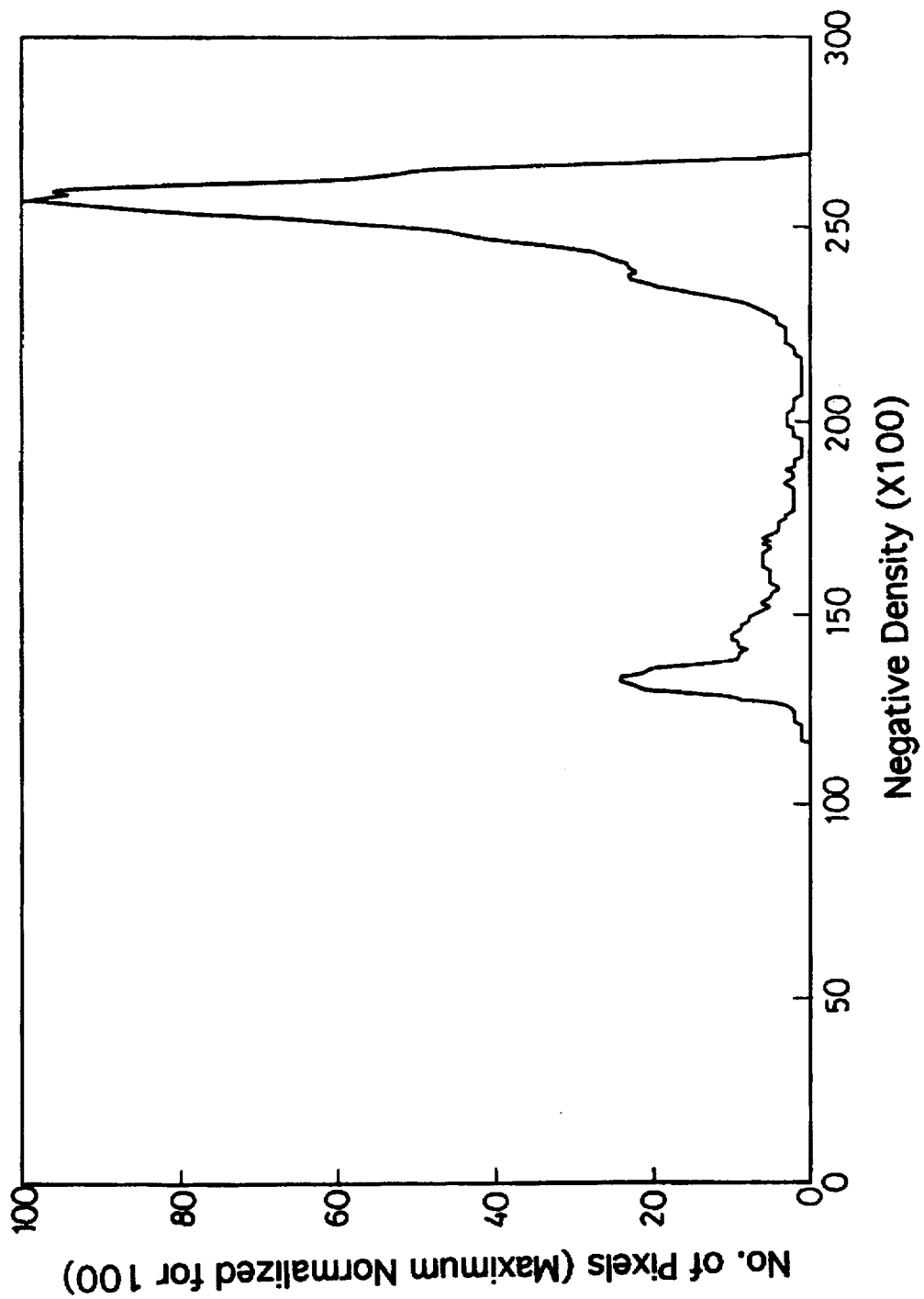
FIG. 5 is a density histogram for the negative image from which the image shown in FIG. 4 was obtained.

FIG. 5 is a density histogram for the entire part of the negative image from which the positive image shown in FIG. 4 was obtained. The maximum value of this histogram is normalized for 100.

Suppose here that the standard skin density for the Japanese is 0.7 (logT). On the negative image, the approximate density difference from 0.0 which is the lightest point of the subject in photography is calculated by:

(0.7−0.0)×γ=0.56 assuming that the gradation (γ) of the negative image is 0.8.

The negative image for the positive image shown in FIG. 4 had a skin density of 1.46, so the lightest point of the subject is 1.46+0.56=2.02 in terms of negative density.

Looking at the histogram shown in FIG. 5, the negative image under consideration obviously obtains many points darker than the density 2.02. In other words, there is an image which, when converted to a positive image, becomes lighter than the density 0.0. Obviously, one cannot obtain the proper amount of exposure for copying even if calculations are performed using such an image.

To eliminate such an inconsistent image (pixels), the method of the invention excludes an image that has an unduly great difference in the amount of film exposure from the principal image (in the illustrated case, this is an image having an undue density difference on the negative image) and determines the amount of exposure for copying from the characteristic quantities of the remaining image.

Figure 6:
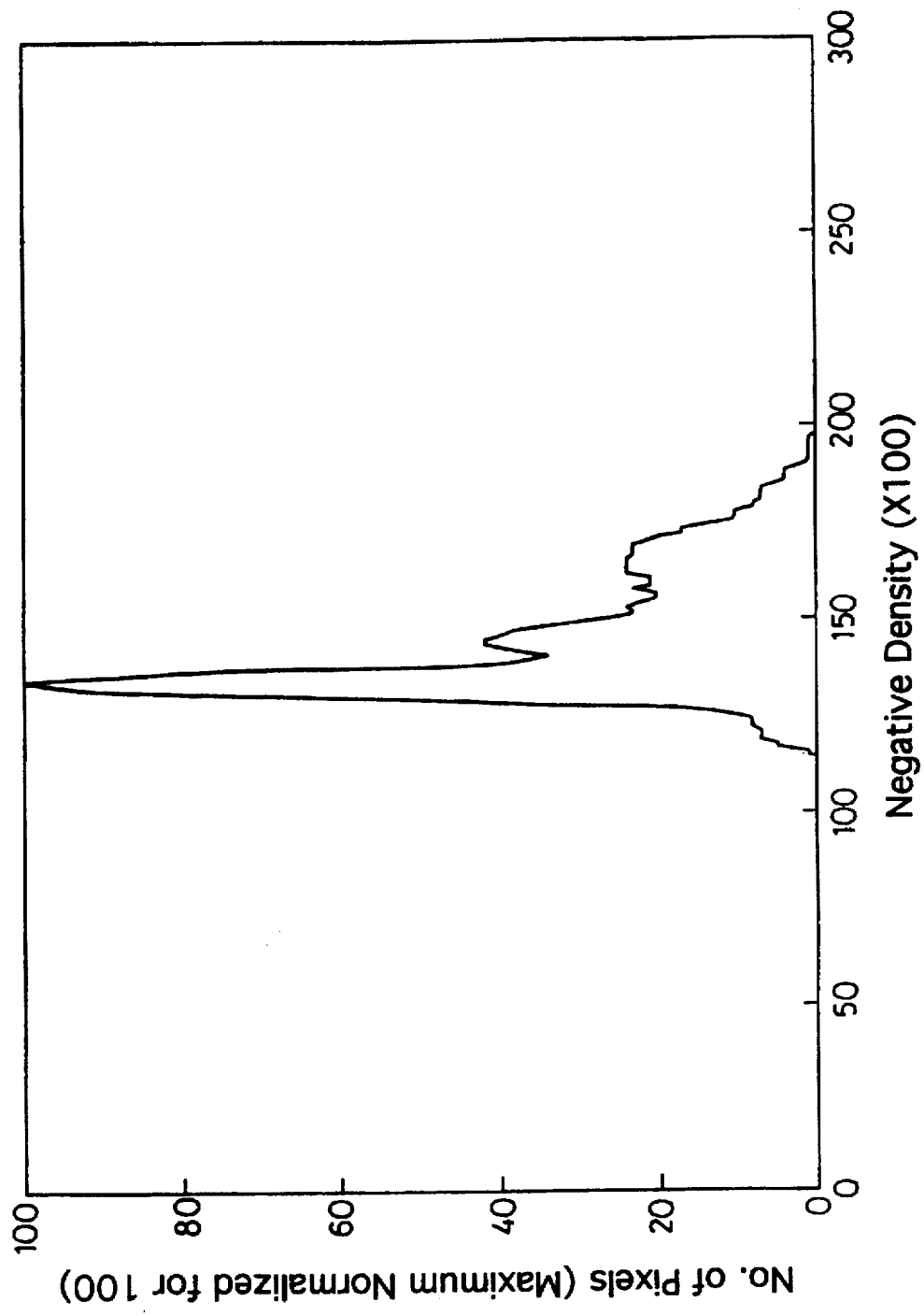
FIG. 6 is a density histogram reconstructed by extracting and effective density range from the histogram shown in FIG. 5.

From the histogram shown in FIG. 5, the range of the principal image density ±0.5 is identified as an image that was shot with the same amount of exposure as that for the principal image and the pixels in this density range are extracted for constructing a histogram as shown in FIG. 6 (the maximum value is normalized for 100 as in FIG. 5), and the image characteristic quantities are calculated from the FIG. 6 histogram to determine the amount of exposure for copying.

The histogram shown in FIG. 6 is constructed by extracting only the human subject, his or her clothes and the window sashes from the image shown in FIG. 4 and, hence, contains no such images as the building, the pole and the sky that have unduly great differences in the amount of film exposure from the principal image.

Stated briefly, if the original to be copied is a negative or reversal film, images (pixels) within the effective density range as set on the original in view of the principal image characteristic quantities are regarded as having been taken with comparable amounts of exposure to the principal image and any other images that have unduly large differences in the amount of film exposure from the principal image are eliminated whereas only the principal image and images that were taken with comparable amounts of film exposure are extracted and the proper amount of exposure for copying is determined from the characteristic quantities of the extracted images.

Thus, in the method of the invention, the amount of exposure for copying is calculated using the principal image on the original and the images that were taken with the same amount of film exposure and this eliminates the need to set corrective parameters in association with backlighting. Furthermore, the information used to calculate the amount of exposure for copying includes not only the principal image but also the background image; hence, compared to the conventional method which relies solely upon the skin density for calculating the amount of exposure for copying, the present invention reduces the possibility of indicating an inappropriate amount of exposure for copying due to variations in the skin color among individuals.

While the amount of best exposure for copying as determined by the method of the invention is variable from scene to scene, correction equivalent to about 0.8–0.9 in terms of density (logT) will be applied to a scene taken with backlighting in such a way that the amount of film exposure for pixels occupying about 70–80% of the original image is greater than the amount for the principal image, whereas correction equivalent to about 0.6–0.7 in terms of density will be applied to a scene take with backlighting in such a way that the amount of film exposure for pixels occupying about 50–60% of the original image is greater that the amount for the principal image.

Conversely, correction equivalent to about 0.6–0.7 in terms of density will be applied to a scene taken with an electronic flash in such a way that the amount of film exposure for pixels occupying about 80–90% of the original image is greater than the amount for the principal image.

Also consider an original image showing the same background but two principal images, a male with suntan and a female with light complexion. According to the conventional method which determines the amount of exposure for copying on the basis of the characteristic quantities of principal images, the resulting difference in density is about 0.3 but this is reduced to as small as about 0.04 if the method of the invention is used.

Thus, according to the method of the invention which designates a portion of the principal image while eliminating the background that was taken with a different amount of film exposure, the formation of improper copy image that has occurred in the conventional LATD system due to density failure in originals is reduced and, what is more, the need to perform complicated data inputting operations such as calculating the amount of exposure based on the principal image characteristic quantities is eliminated, thereby permitting the proper amount of exposure to be determined in an easy way.

The operation which the copier 10 performs to copy the image of a transmission-type original T by the above-described method of the invention for determining the proper amount of exposure will now be explained.

The operator first places the transmission-type original T on the scan table 188. After setting the copy ratio, the operator touches the START button. Then, the light source 162 turns on and the scan table 188 starts a prescan mode to scan the original T.

The light issuing from the light source 162 passes through the IR cut filter 168, the UV cut filter 170 and the B-G notch filter 172 successively to be admitted into the original T, and the transmitted light carrying the image information from the original T passes though the slit 164. In this operating mode, the respective color filters and the variable diaphragm 184 keep clear of the optical path Lt. Alternatively, they may be inserted into the optical path Lt in accordance with the standard conditions for copying the original T.

The transmitted light passing through the slit 164 is deflected through an angle of 90° by the moving mirror 156 which is inserted into the optical path Lt as indicated by a dashed line in FIG. 3 and then focused on the line sensor 160 by means of the imaging lens 158; thus, the image of the original T is separated into the three primary colors R, G and B and read for each of these colors at a resolution of 256 pixels per line.

The output from the line sensor 160 is forwarded to the control unit 178, which performs the necessary processing on the output so that the original image that has been read (which is a positive image if the original T is a negative film) is displayed on the monitor 19.

The operator watches the displayed image and designates the principal image. The control unit 178 applies the already-descried method of the present invention to the designated principal image; it calculates the characteristic quantities of the principal image, determines a particular density range from the calculated principal image characteristic quantities, extracts only the pixels within the particular density range from the whole image to determine the image characteristic quantities, then determines the amount of exposure for copying (i.e., the amounts by which the respective color filter plates in the filter section should be inserted into the optical path Lt and the amount by which the variable diaphragm 184 should be inserted into the optical path Lt) from the determined image characteristic quantities; and supplies relevant instructions to the adjusting means 176 and 186.

In accordance with the thus determined amount of exposure for copying, the adjusting means 176 and 178 functions to insert the respective color filter plates in the filter section and the variable diaphragm 184 into the optical path Lt, whereupon the moving mirror 156 is retracted from the optical path Lt by moving to the position indicated by a solid line in FIG. 3. Thereafter, the light source 162 turns on and the original T starts to be scanned for copying its image. As already mentioned, the speed of this main scanning step is dependent on the speed at which the thermally processable light-sensitive material A is scanned in the exposing section 38 and on the copy ratio.

The light issuing from the light source 162 passes through the IR cut filter 168, the UV cut filter 170 and the B-G notch filter 172 successively and has its color and quantity adjusted by the respective color filter plates and variable diaphragm 184 which have been inserted into the optical path Lt in accordance with the determined amount of exposure; the thusly adjusted light is admitted through the original T and the transmitted light carrying the image information from the original T passes through the slit 164.

The light passing through the slit 164 is magnified to the copy radio setting by means of the zoom lens 152 and thereafter reflected by the mirror 154. As already mentioned, for the copying of the original T, the mirror 148 pivots to the position indicated by a dashed line in FIG. 3, so the transmitted light is reflected by the mirror 150 to focus on the thermally processable light-sensitive material A which was withdrawn out of the magazine 20, cut to a predetermined length and transported through the exposing section 38 is synchronism with the above-described operation, thereby performing slit scan exposure on the material A.

The thusly exposed light-sensitive material A is brought into the switchback section 42, then reversed to enter the water applicator section 46, where it is coated with water which is an image forming solvent; thereafter, the image-receiving material B which was withdrawn out of the magazine 60, cut to a predetermined length and subsequently transported is combined with the light-sensitive material A by means of the laminating roller 80 and the resulting combination is brought into the thermal development and transfer section 58.

The combination of the light-sensitive material A and the image-receiving material B is subjected to thermal development and transfer as it is transported through the gap between the endless belt 96 and the heating drum 82. Thereafter, the light-sensitive material A is first stripped from the heating drum 82 by means of the strip finger 90 and then the image-receiving material B onto which the image has been transferred is stripped from the heating drum 82 by means of the strip finger 92.

The stripped light-sensitive material A is guided by the transport guide plate 114 and other associated members to be brought into the scrap light-sensitive material stack box 115, whereas the image-receiving material B carrying the transferred image is guided by the transport guide plates 118 and other associated members to be ejected onto the tray 126 to produce a hard copy.

The foregoing description of the method of the present invention for determining the proper amount of exposure is mostly directed to the case of copying the image of a transmission-type original, particularly, a negative film. It should, however, be understood that this is not the sole case of the invention and it may be applied for copying the image from positive transmission-type originals such as reversal films and lantern slides, as well as for copying image from reflection-type originals such as printed matter and photographs.

Needless to say, the method of the present invention for determining the proper amount of exposure is in no way limited to the case described above and various modifications and improvements can be made without departing from the spirit and scope of the invention.

As described in detail on the foregoing pages, the method of the present invention for determining the proper amount of exposure has the advantage that when applied to various types of optical image forming apparatus such as copiers, printers and photograph printing devices, it is capable of determining the proper amount of exposure by a simple scanning procedure even if the original to be duplicated is a negative film or other medium having density failure and it hence ensures the formation of the proper and high-quality image in a consistent manner.

What is claimed is:

1. A method of determining the proper amount of exposure comprising the steps of:

reading the entire portion of an original image, said original image comprising a principal image and a background image;

calculating the characteristic quantities of said principal image within the original image;

determining a particular density range from the calculated characteristic quantities of the principal image;

extracting only the pixels in said particular density range from the entire portion of the original image to determine the characteristic quantities of the original image; and determining the proper amount of exposure from said characteristic quantities of the original image, said method excluding an effect of said background image on said proper amount of exposure.

2. A method according to claim 1, wherein said characteristic quantities of the principal image in the original image are calculated from image densities of a principal image region within the original image.

3. A method according to claim 2, wherein said principal image region is a preset fixed region in the middle of the original image.

4. A method according to claim 2, wherein said principal image region is a preset fixed region centering on a position of the principal image designated in the original image.

5. A method according to claim 4, wherein said position of the principal image is designated within the original image outputted on a display.

6. A method according to claim 2, wherein said principal image region is obtained by extracting a preset decision region including a pixel at a position of the principal image within the original image, then determining a average density of the preset decision region, and identifying a pixel region that includes the position of the principal image and which has a density close to the determined average density.

7. A method according to claim 6, wherein said position of the principal image is a position in the middle of the original image.

8. A method according to claim 6, wherein said position of the principal image is designated within the original image outputted on a display.

9. A method according to claim 6, wherein said preset decision region is a pixel region including nine pixels centering on the pixels at the position of the principal image.

10. A method according to claim 2, wherein one of said characteristic quantities of the principal image is either one of a average density of the principal image region, a maximum density of the principal image region and a minimum density of the principal image region.

11. A method according to claim 10, wherein after reading the entire portion of the original image, a density histogram of the entire portions of the original image is constructed.

12. A method according to claim 11, wherein said particular density range is set as an effective density range on the basis of the density histogram and the characteristic quantities of the principal image.

13. A method according to claim 12, wherein setting method of said effective density range is either one of a method for determining a preset density range by using the average density of the principal image region as a basis, a method for setting a density range in a principal image including area in the density histogram in consideration of its correlation with a normal distribution, and a method for setting a density range from the maximum density of the principal image region to the minimum density of the principal image region.

14. A method according to claim 13, wherein said effective density range is a density range of from ±0.2 to ±0.6 in the terms of logT on the basis of the average density of the principal image region.

15. A method according to claim 13, wherein said effective density range is a density range of ±0.5 in terms of logT on the basis of the average density of the principal image region.

16. A method according to claim 13, wherein said effective density range is determined by taking into account a recordable exposure range for a record medium used for recording the original image.

17. A method according to claim 1, wherein said characteristic quantities of the original image are obtained by reading the entire portion of the original image, then constructing a density histogram of the entire portions of the original image, setting an effective density range as the particular density range on the basis of the density histogram of the entire portions of the original image and the characteristic quantities of the principal image, extracting only pixels in the effective density range from the density histogram of the entire portions of the original image, constructing a density histogram of only the pixels in the effective density range, and being calculated from the density histogram of only the pixels in the effective density range.

* * * * *